United States Patent [19]

Andrä et al.

[11] Patent Number: 4,757,982
[45] Date of Patent: * Jul. 19, 1988

[54] ENGINE MOUNT WITH HYDRAULIC DAMPING

[75] Inventors: Rainer Andrä, Limburg; Manfred Hofmann, Hünfelden, both of Fed. Rep. of Germany

[73] Assignee: Metzeler Kautschuk GmbH, Munich, Fed. Rep. of Germany

[*] Notice: The portion of the term of this patent subsequent to Mar. 17, 2004 has been disclaimed.

[21] Appl. No.: 803,080

[22] Filed: Nov. 29, 1985

[30] Foreign Application Priority Data

Nov. 29, 1984 [DE] Fed. Rep. of Germany ....... 3443618

[51] Int. Cl.$^4$ ............ B60K 5/12; F16F 13/00; F16F 9/08; B60G 15/00
[52] U.S. Cl. .................. 267/219; 267/35; 267/140.1; 267/140.3; 267/140.5; 267/141.1; 267/152; 267/64.27; 248/562; 248/636
[58] Field of Search ............... 267/140.1, 8 R, 22 A, 267/35, 63, 64.15–64.27, 121, 122, 140, 113, 140.2–140.5, 141, 141.1–141.7, 153, 152, 219, 22, 8; 248/562, 636, 580, 565, 634, 619–621, 583, 605–607, 559, 573, 574, 631, 612; 188/298, 320, 378–39; 180/300, 312; 123/192, 195

[56] References Cited

U.S. PATENT DOCUMENTS

| | | | |
|---|---|---|---|
| 2,610,016 | 9/1952 | Crede | 267/140.1 |
| 2,610,017 | 9/1952 | Lambert, Jr. et al. | 267/140.1 |
| 2,655,005 | 10/1953 | Kinneman | 267/141.1 X |
| 4,199,128 | 4/1980 | Van dem Boom et al. | 267/140.1 X |
| 4,342,446 | 8/1982 | Eaton et al. | 267/35 |
| 4,469,316 | 9/1984 | Van dem Boom et al. | 267/140.1 |
| 4,632,370 | 12/1986 | Ticks et al. | 267/35 X |
| 4,643,405 | 2/1987 | Hofmann et al. | 267/140.1 X |
| 4,650,168 | 3/1987 | Andrä et al. | 267/140.1 |

FOREIGN PATENT DOCUMENTS

| | | | |
|---|---|---|---|
| 0115417 | 8/1984 | European Pat. Off. | 267/140.1 |
| 0183267 | 6/1986 | European Pat. Off. | 248/562 |
| 0191703 | 8/1986 | European Pat. Off. | 267/8 R |
| 2652501 | 5/1978 | Fed. Rep. of Germany . | |
| 3142673 | 5/1983 | Fed. Rep. of Germany | 267/140.1 |
| 3207889 | 9/1983 | Fed. Rep. of Germany | 267/35 |
| 3245653 | 6/1984 | Fed. Rep. of Germany | 267/140.1 |
| 3336204 | 5/1985 | Fed. Rep. of Germany . | |
| 3347273 | 7/1985 | Fed. Rep. of Germany | 248/562 |
| 3505632 | 9/1985 | Fed. Rep. of Germany | 267/140.1 |
| 1047112 | 12/1951 | France | 248/562 |
| 2524951 | 10/1983 | France | 267/140.1 |
| 0066539 | 6/1981 | Japan | 267/140.1 |
| 57-161331 | 10/1982 | Japan | 267/140.1 |
| 0196341 | 11/1983 | Japan . | |
| 58-196341 | 11/1983 | Japan | 267/140.1 |
| 2122718 | 1/1984 | United Kingdom | 267/35 |

*Primary Examiner*—Douglas C. Butler
*Attorney, Agent, or Firm*—Herbert L. Lerner; Laurence A. Greenberg

[57] ABSTRACT

An engine mount with hydraulic damping, includes at least one fluid-filled working chamber having a substantially conical shell-shaped rubber-elastic peripheral wall serving as a support spring, a support ring being connected to the peripheral wall and having an upper surface, a thrust element with adjustable radial stiffness in the form of a holding plate vulcanized to the upper surface of the support ring and closing the working chamber along with the support ring, the holding plate having a central cylindrical portion projecting freely into the working chamber and having an inner surface, a bell-shaped expanded ring projecting from the inner surface on the cylindrical portion toward the peripheral wall and having a free end, and a rubber-elastic membrane closing the free end of the expanded ring enclosing a volume of air.

6 Claims, 1 Drawing Sheet

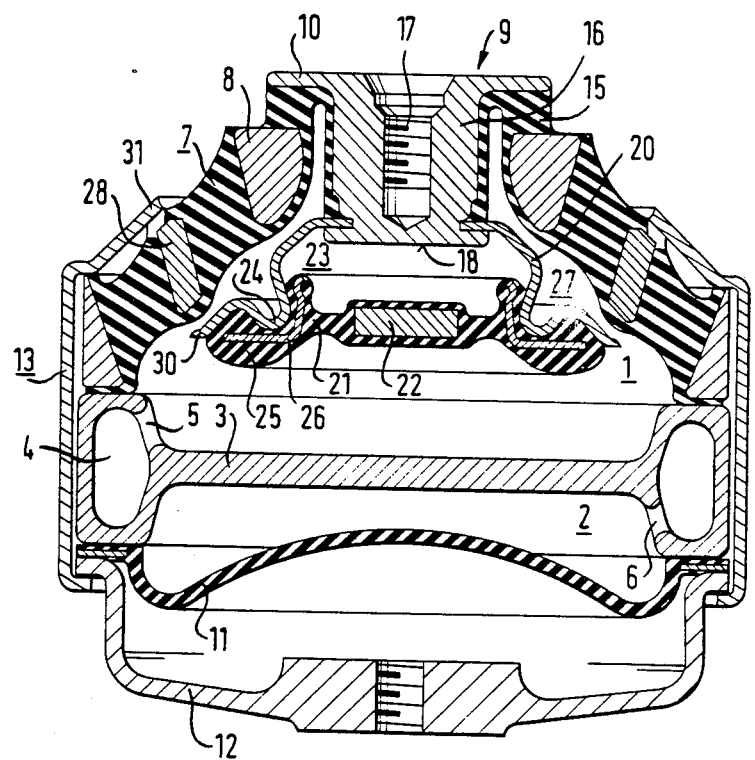

ENGINE MOUNT WITH HYDRAULIC DAMPING

The invention relates to an engine mount or motor support with hydraulic damping, especially for motor vehicles, having at least one fluid-filled working chamber with an approximately conical shell-shaped rubber-elastic peripheral wall serving as a support spring, the chamber being closed at the top thereof by a support ring and by a thrust element with adjustable radial stiffness in the form of a holding plate vulcanized to the upper surface of the support ring, the holding plate having a central cylindrical portion projecting freely into the working chamber.

An engine emount of this type is known from German Published, Non-Prosecuted Application DE-OS No. 26 52 501 having only slightly adjustable radial stiffness. Furthermore, such a support was already proposed for German Published Non-Prosecuted Application DE-OS No. 33 36 204, corresponding to allowed U.S. application Ser. No. 657,737, filed Oct. 4, 1984. In that case, a control of the radial stiffness is only possible by varying the parameters of the elastomer material which receives the holding plate.

In contrast to this, it is an object of the invention to provide an engine mount with hydraulic damping, which overcomes the hereinafore-mentioned disadvantages of the heretofore-known devices of this general type, wherein the radial stiffness can be influenced additionally and which simultaneously provides integral travel limitations in the pulling direction as well as in the pressure direction.

With the foregoing and other objects in view there is provided an engine mount or motor support especially for motor vehicles with hydraulic damping, comprising at least one fluid-filled working chamber having a substantially conical shell-shaped rubber elastic peripheral wall serving as a support spring, a support ring being connected to the peripheral wall and having an upper surface, a thrust element with adjustable radial stiffness in the form of a holding plate vulcanized to the upper surface of the support ring and closing the working chamber along with the support ring, the holding plate having a central cylindrical portion projecting freely into the working chamber and having an inner surface, a bell-shaped expanded ring projecting from the inner surface of the cylindrical portion toward the peripheral wall and having a free end, and a rubber-elastic membrane closing the free end of the expanded ring enclosing a volume of air. Due to the bell-shaped expanding ring an additional ring space is created between the ring and the peripheral chamber wall having a fluid volume which provides an additional damping effect in the case of radial motions of the thrust element.

In accordance with another feature of the invention the expanded ring has an outer surface substantially parallel to the inner contour of the peripheral wall.

In accordance with a further feature of the invention there is provided a compensating chamber and an intermediate plate disposed between the chambers, the expanded ring being retained by the membrane at a retaining location, the ring having a toric recess formed therein in the vicinity of the retaining location, and the membrane having a thickened rubber layer in the vicinity of the retaining location forming a stop striking the intermediate plate when the membrane moves in a given pressure direction.

In accordance with an added feature of the invention the expanded ring has an outer rim serving as a stop against the peripheral wall, and the peripheral wall has a metallic ring vulcanized therein in the vicinity of the rim extending through the entire thickness of the peripheral wall and serving as a stop for tension loads.

In accordance with an additional feature of the invention there is provided a ring at least partially enclosing the engine mount having a pulled-in rim covering the outer surface of metallic ring. This causes a limitation of the possible stretching in the direction in which a pulling force is applied.

In accordance with a concommitant feature of the invention there is provided a circular disc-shaped quenching mass enclosed by the membrane.

Other features which are considered as characteristic for the invention are set forth in the appended claims.

Although the invention is illustrated and described herein as embodied in an engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, togther with additional objects and advantages thereof will be best understood from the following description of specific embodiments when read in connection with the single FIGURE of the drawing which is a longitudinal-sectional view of an engine mount according to the invention Referring now to the FIGURE of the drawing in detail, it is seen that the engine mount or motor support has a working chamber 1 and a compensating chamber 2, which are connected with each other through a spiral channel 4 adjacent an intermediate plate 3, the channel having an inlet 5 and an outlet 6. The working chamber 1 is enclosed by a peripheral wall 7, which is substantially conical and functions as a bearing or support spring. The wall 7 is closed at the end surface thereof by a support ring 8 and by a thrust element 9 in the form of a holding element 10 vulcanized onto the upper surface of the support ring 8 with adjustable radial stiffness.

The compensating chamber 2 is bordered by an elastic bellows 11 and is closed at the bottom thereof by a lower housing cover 12 which simultaneously serves as a mounting point. The essential parts forming the engine mount i.e. the conical peripheral wall 7, the intermediate plate 3 with the channel 4, the bellows 11 and the housing 12, are enclosed by an outer ring 13 and clamped against each other forming a tight seal.

The adjustment of the radial stiffness of the thrust element 9 is essentially achieved by suitable dimensioning and setting of the characteristic of rubber material 15, which is vulcanized between the flange of the holding plate 10 and the top of support ring 8. Furthermore, the thrust element 9 is provided with a cylindrical portion 16, which projects freely into the working chamber 1 and which has a threaded hole 17 formed thereof for attaching the engine or motor which is to be supported.

According to the invention, a ring 20 is disposed at the inner and surface 18 of the cylindrical part 16 which expands in the shape of a bell in the direction toward the chamber wall 7, so that the ring 20 encloses a ring space 27 which is open toward the working chamber 1. During certain radial motions of the thrust element 9, an additional damping effect is provided for these radial motions due to the displacement of fluid inside of the ring space 27.

Additionally, the free end of the bell-shaped expanded ring 20 is closed by a rubber-elastic membrane 21, which surrounds a circular quenching mass 22, and encloses an air volume 23 inside the ring 20 which permits an adjustable damping of the vibrations of the quenching mass.

Furthermore, the ring 20 has a toric or bulging recess 24 in the vicinity of the membrane 21, which carries a thickened rubber layer 25 facing toward the separating wall 3 and being connected directly to the actual membrane 21 by an angular stiffening ring 26, serving as a tensioning ring for holding the membrane 21 in the ring 20. The rubber layer 25 also serves as a stop in the direction of pressure against the intermediate plate 3, to prevent a spring action of the engine mount which is too strong.

At the same time, the outer rim 30 of the ring 20 can also serve as a stop in the pulling direction against the chamber wall 7. In order to avoid overloading of the chamber wall 7 during sudden loads of tension with great amplitude, it is advantageous if a metallic ring 28 is vulcanized into the chamber wall. The ring 28 extends through the whole wall thickness and is covered at its outer surface by a pulled-in rim 31 of the ring 13, which encloses the engine mount.

In this way an engine mount is provided which on one hand additionally damps motions in the radial direction and on the other hand simultaneously provides an integrated stop in both directions, for pressing as well as pulling forces. In this way, overloads and therefore possible damage to the engine mount can be reliably avoided.

We claim:

1. Engine mount with hydraulic damping, comprising a working chamber, a compensating chamber, an intermediate plate being disposed between said chambers and having a channel formed therein interconnecting said chambers, hydraulic fluid filling said chambers, rubber-elastic peripheral walls surrounding said chambers, one of said peripheral walls serving as a support spring and being substantially conical defining an open end of one of said chambers, a support ring at said open end of said one chamber, said support ring having an open recess formed therein with a given diameter, a thrust element vulcanized to said support ring, said thrust element including a cylindrical mounting plate having a cylindrical portion with a diameter smaller than said given diameter projecting into said recess and into said one chamber, said cylindrical portion having an inner surface, a bell-shaped ring fastened to and extending radially outwardly from said inner surface of said cylindrical portion defining a cross section inside said bell-shaped ring, and a rubber membrane disposed inside said bell-shaped ring covering said cross section and enclosing an air-filled membrane chamber.

2. Engine mount according to claim 1, wherein said bell-shaped ring has an outer surface substantially parallel to the inner contour of said one peripheral wall.

3. Engine mount according to claim 1, wherein said bell-shaped ring is retained by said membrane at a retaining location, said ring has a toric recess formed therein in the vicinity of said retaining location, and said membrane having a thickened rubber layer in the vicinity of said retaining location forming a stop striking said intermediate plate when said membrane moves in a given pressure direction.

4. Engine mount according to claim 1, wherein said expanded bell-shaped ring has an outer rim, and said one peripheral wall has a metallic ring vulcanized therein in the vicinity of said rim extending through the entire thickness of said one peripheral wall and serving as a stop for tension loads.

5. Engine mount according to claim 4, including another ring at least partially enclosing the engine mount having a pulled-in rim covering the outer surface of said metallic ring.

6. Engine mount according to claim 1, including a circular disc-shaped quenching mass enclosed by said membrane.

* * * * *